United States Patent
Gebelius

[11] Patent Number: 6,135,004
[45] Date of Patent: Oct. 24, 2000

[54] SAW BLADE

[76] Inventor: Sven Runo Vilhelm Gebelius, deceased, late of Nynäshamn, Sweden, by Staffan Standberg, executor

[21] Appl. No.: 08/817,961
[22] PCT Filed: Jul. 14, 1995
[86] PCT No.: PCT/SE95/00858
§ 371 Date: Sep. 21, 1998
§ 102(e) Date: Sep. 21, 1998
[87] PCT Pub. No.: WO96/13363
PCT Pub. Date: May 9, 1996

[30] Foreign Application Priority Data

Nov. 1, 1994 [SE] Sweden ................................ 9403767

[51] Int. Cl.[7] ............................ B23D 57/00; B27B 13/02
[52] U.S. Cl. ................................. 83/835; 83/846; 83/854; 83/855
[58] Field of Search ............................ 83/835, 836, 846, 83/853, 854, 855, 851, 676

[56] References Cited

U.S. PATENT DOCUMENTS

| | | |
|---|---|---|
| 2,555,428 | 5/1951 | Tuttle . |
| 3,111,970 | 11/1963 | Priest et al. .............................. 83/855 |
| 3,309,756 | 3/1967 | Segal ..................................... 83/851 X |
| 3,576,061 | 4/1971 | Pahlitzsch ............................ 83/854 X |
| 3,818,561 | 6/1974 | Montana et al. ...................... 83/836 X |
| 3,924,318 | 12/1975 | Baker ................................... 83/835 X |
| 4,011,783 | 3/1977 | Mobley ..................................... 83/846 |
| 4,137,808 | 2/1979 | Mattes ..................................... 83/851 |
| 4,173,914 | 11/1979 | Vollmer et al. ........................... 83/848 |
| 4,604,933 | 8/1986 | Lesher et al. ............................. 83/851 |

FOREIGN PATENT DOCUMENTS

| | | |
|---|---|---|
| 352549 | 1/1973 | Sweden . |
| 458096 | 1/1989 | Sweden . |

Primary Examiner—M. Rachuba
Attorney, Agent, or Firm—Jacobson, Price, Holman & Stern, PLLC

[57] ABSTRACT

Saw blade utilized for applications in which two saw blades are arranged located in an adjacent relationship and with opposed rotary direction in relation to each other. Every side portion of each saw tooth adjacent to a first side plane, being the side plane in use intended to be located adjacent to a similar co-acting saw blade, extending substantially parallel in relation to the first side plane, but with an extension more closely related to the central portion of the saw blade, separated from the first side plane by a smaller distance. Furthermore, the outer edge portion of each saw tooth adjacent to a second side plane of the saw blade is arranged with a peripherally initially substantially straight part, located outside the second side plane and in a substantially parallel relationship thereto, and which is transformed into an inclined part in relation to the second side plane, arranged to create a clearance angle. The side portions of the saw blade are advantageously arranged with one or a number of through holes or channels, during rotation in operative direction being arranged to supply an air jet from the second side plane to the first side plane, i.e. to the intermediately located space between two co-acting saw blades.

9 Claims, 2 Drawing Sheets

SAW BLADE

TECHNICAL FIELD

The present invention relates to a saw blade, and in particular to a saw blade of the type used for applications in which two saw blades are arranged adjacently located with an opposed rotary direction in relation to each other.

BACKGROUND ART

A pair of saw blades for use as above are previously known from SE-B 458 096, each saw blade having the saw teeth set only in a direction away from an adjacent saw blade. It is also stated as an alternative that the saw teeth can be arranged with cutting members of carbide material or similar material, having a width extension exceeding the width of a supporting saw tooth, and extending away from the side surface which is located adjacent to a co-acting saw blade. Such a cutting member should be arranged in a conventional way, i.e. having an angle of clearance by the outer side portion. This is also clearly stated in the specification of said patent, in which it is stated that "such an embodiment gives the advantages otherwise obtained by setting of saw teeth".

The above described pair of saw blades, which in this connection must be regarded as defining the state of art, involve a major step forward when sawing compared to prior art with only one single saw blade, but results in a cut surface having conventional surface structure, i.e. with curved visible marks corresponding to the radius of the saw blade. The saw cuts also normally require a later burr removing operation, a costly operation which obviously, if possible, should be avoided.

The object of the present invention is to disclose an improved saw blade of the above stated type, i.e. of the type used as a pair in adjacent position to each other and having an opposed rotary relationship to each other, which removes the above stated disadvantages. With the saw blade according to the present invention a saw cut of highest quality is thus achieved without visible curved machining marks, and formation of burrs by the cut surface is also avoided, hence also removing the need for a later deburring operation.

DISCLOSURE OF INVENTION

The saw blade according to the present invention is intended to be used for applications in which two saw blades are arranged in an adjacent relationship having in relation to each other opposed rotary directions, and with a first side portion of each saw tooth arranged extending substantially parallel to a first side plane of the saw blade, in use intended to be located adjacent to a similarly shaped co-acting saw blade, and it is mainly characterized in that said first side portion of the saw teeth have an extension more closely to the central portion of the saw blade in relation to the first side plane, separated from said side plane by a smaller distance. As a further characteristic feature can be stated, that the outer edge portion of each saw tooth by a second side plane of the saw blade includes a peripherally initially substantially straight part, located outside the second side plane and in a substantially parallel relationship thereto, and which is transformed into a direction towards the second side plane inclined part, arranged to form an angle of clearance.

BRIEF DESCRIPTION OF DRAWINGS

Examples of embodiments of a saw blade according to the present invention will now be more fully described with reference to the accompanying drawings, in which.

MODES FOR CARRYING OUT THE INVENTION

Figure 1:
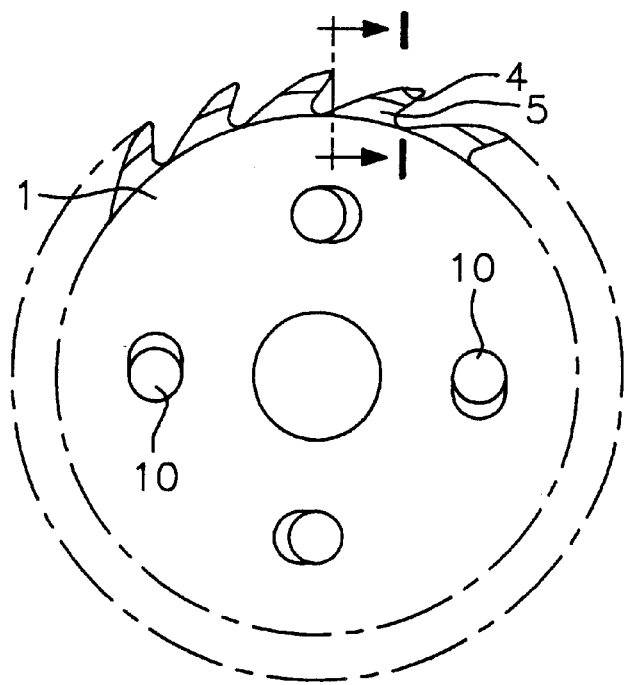
FIG. 1 is a side view of a saw blade according to the present invention.
Figure 2:
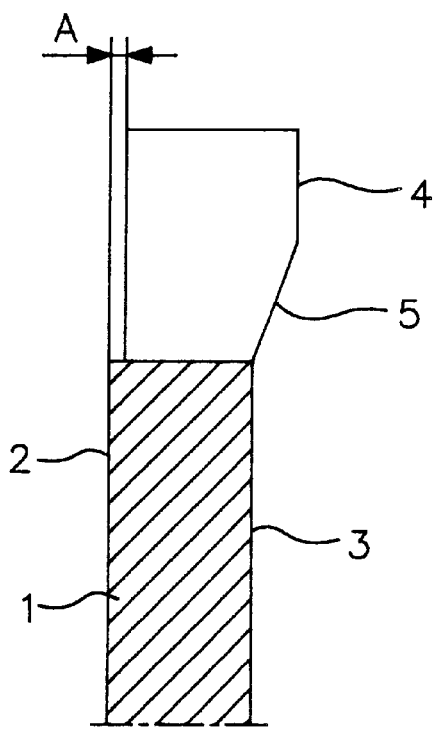
FIG. 2 is a view I—I in cross-section and enlarged scale of the saw blade shown in FIG. 1.

With reference to FIGS. 1 and 2, a saw blade is shown, as a complete unit denominated 1, the peripheral part having saw teeth, arranged according to FIG. 2.

As disclosed in FIG. 2, the saw blade 1 according to the invention, in difference to previously known saw blades, is arranged with each saw tooth adjacent to a first side plane 2 (which is the side plane intended to be located adjacent a reversed rotating saw blade 1' of the same type) slightly ground down (or inwardly located) in relation to the side plane 2, the depth ground down being denominated A. The opposed side surface of each saw tooth is, in relation to the second side plane 3 of the saw blade 1, located outside the second side plane 3, and has an initially straight part 4, substantially parallel in relation to the second side plane 3, which is transformed into an inclined part 5 in relation to the second side plane 3, arranged to form a clearance angle.

The part of each saw tooth that has been ground down with the grinding depth denominated A is advantageously parallel in relation to adjacently located first side plane 2, but may also be arranged with a smaller clearance angle. The depth ground down A is relatively small, in the range of 0,005–0,05 mm, and preferably approximately 0,02 mm. The straight part 4 at the opposed side of each saw tooth is arranged having a longitudinal extension of 1–5 mm, and preferably approximately 2 mm.

Practical tests performed with two adjacently located saw blades 1, 1' arranged as above, and rotating in an opposed relationship to each other, have resulted in saw cuts which do not require a succesively following deburring operation, and which have a cut surface completely free from the curved marks which indicate that the surface has been accomplished by means of a sawing operation. Furthermore, the design of the saw teeth has eliminated all problems with material collection between the saw teeth of the adjacently located saw blades 1, 1'. In addition, side portions of the saw blade include at least one through hole or channel 10. During rotation in an operative direction, the through holes or channels supply an air jet from the second side plane to the first side plane.

An alternative way to manufacture a saw blade according to the invention is obviously to utilize individual cutting members of carbide material or other suitable material, which are attached at a side displaced distance in relation to the first side plane 2 of the saw blade 1, and which otherwise correspond to the saw tooth shown in FIG. 2. The supporting saw blade 1 is arranged with a surrounding ground down portion in relation to the side plane 2 with a ground down depth corresponding to or exceeding the ground down depth A, and the individual cutting members are attached in such a way, that the side portion adjacent to the side plane receives the distance A from the first side plane 2.

Figure 4:
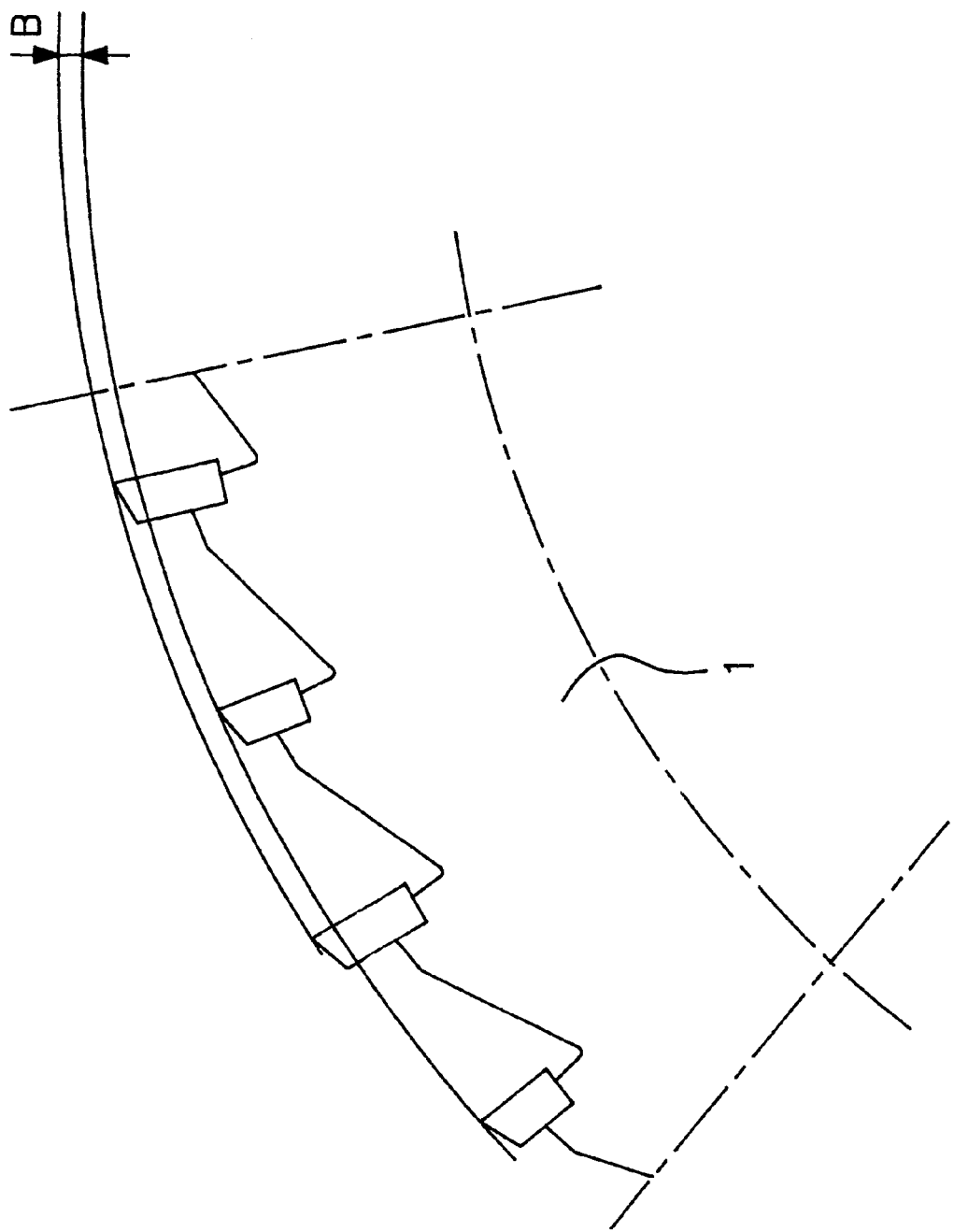
FIG. 4 shows a radial outer portion of a saw blade, intended to illustrate an example of a further modification of a saw blade according to the invention.

An example of an embodiment having cutting members of carbide type or similar attached to the saw blade 1 is shown in FIG. 4, which intends to illustrate a further modification intended to further improve the properties of the saw blade 1. When, for example, sawing metal pipes having a relatively thin wall thickness, the applied pressure, particularly during the initial phase of a sawing operation, should not be too high, in order to avoid plastical deformation of the work piece. It is further desirable to initially and as soon as possible obtain cutting engagement with the work piece, in order to avoid that used saw blades 1, 1' "walk" along the peripheral portion of the work piece, which on one hand results in damage of the work piece adjacent to the end portions cut off, and on the other hand also cause problems to initiate a sawing operation exactly at a desired point.

By arranging the saw teeth with an alternating different radial extension B in direction from the center of the saw blade 1, the initial engaging cutting effect is considerably improved, whereby the above mentioned problems are removed. FIG. 4 discloses an example of a preferred embodiment, in which each other saw tooth has a larger radial extension in relation to intermediately located saw teeth. However, this embodiment can be further modified, for example with groups of saw teeth, e.g. two saw teeth in each group, alternately following each other, being different from each other with regard to radial extension from the rotary center of the saw blade 1. Practical tests have shown that the distance B can be rather small (0,05–0,20 mm) for saw blades intended for metal, but still accomplish an extremely positive effect. As an example a suitable difference measure B in a preferred embodiment can be stated as 0,10–0,15 mm. Since the difference measure B between single or each other following groups of saw teeth is related to the material of the work piece, same may for certain applications be considerably larger, for example 1–2 mm. Stated difference measure B is thus choosen with regard given to the or those types of material which are intended to be machined with the saw blade, and the examples stated are thus non-limiting for the invention.

Even though it is not shown in the drawing figures, the saw teeth of a saw blade 1 according to the present invention can obviously be arranged with common clearance angles from the cutting and in rotary direction forward edge portions of each saw tooth.

Figure 3:
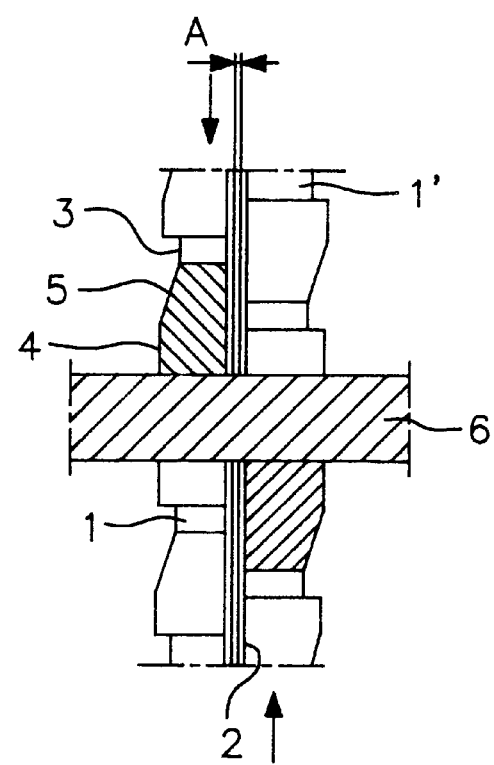
FIG. 3 shows two saw blades according to the invention during a sawing operation.

The saw blade according to the present invention makes it obviously also possible to locate two as a pair arranged saw blades 1, 1' in a very close adjacent relationship to each other. This is intended to be shown In FIG. 3, which schematically shows two saw blades 1, 1' in connection with the engagement of same against a work piece 6. The risk for interacting engagement of the saw teeth on the saw blades 1, 1' rotating in opposed directions to each other is completely eliminated by the ground down portion denominated A.

Shown and described examples of saw blades 1 according to the present invention remove thus the problems which can be encountered with previously known saw blades intended to be used as a pair and rotating in opposed directions to each other, and also result in accomplishment of considerably improved saw cuts, on one hand with regard to surface structure, and on the other hand with regard to formation of burrs, which as previously has been mentioned are substantially not formed.

The saw blade according to the present invention is obviously not in any way restricted to described and shown examples of embodiments, but may of course be further modified within the scope of the inventive thought and the following claims. For example, the side portions of the saw blade may thus include through holes or air channels arranged to create a pneumatic pressure between two adjacently located saw blades 1, 1' rotating in opposed direction in relation to each other, intended to maintain a predetermined separated distance therebetween.

Industrial Applicability

As previously described, the present invention overcomes previously known problems in machining by means of sawing, such as badly cut surfaces, plastical deformation of the work piece, and formation of burrs adjacent to a cut surface. This means that postmachining substantially altogether can be avoided, which results in that sawn products can be manufactured in a shorter time and at a lower manufacturing cost, usually with a quality that considerably exceeds what has previously been considered as possible for a sawing operation.

What is claimed is:

1. Saw blade utilized for applications in which two saw blades are arranged located in an adjacent relationship and with opposed rotary direction in relation to each other, and in which a first side portion of each saw tooth extends substantially parallel in relation to a first side plane of the saw blade, the saw blade, in use, being intended to be located adjacent to a similar co-acting saw blade, said first side portion of the saw teeth having an extension edge portion located closer to a central portion of the saw blade in relation to the first side plane, separated from said first side plane by a separation distance, and an outer edge portion of each saw tooth adjacent to a second side plane of the saw blade includes a peripherally initially substantially straight part, located outside the second side plane and in a substantially parallel relationship thereto, and said substantially straight part being transformed into an inclined part in relation to the second side plane, arranged to create a clearance angle.

2. Saw blade according to claim 1, wherein the initially substantially straight part has a longitudinal extension in a range of 1–5 mm.

3. Saw blade according to claim 1, wherein the separation distance between the first side plane of the saw blade and the extension edge portion of the saw teeth is in a range of 0.005–0.05 mm.

4. Saw blade according to claim 1, wherein the saw blade with associated teeth is arranged as one integrated unit, with a surrounding recess in connection with the first side plane forming the distance to the extension edge portion of the saw teeth.

5. Saw blade according to claim 1, wherein the saw blade is arranged with cutting members, arranged attached to supporting saw teeth members at the saw blade, and that said supported cutting members are attached and arranged with such a cross-sectional configuration that a side surface adjacent to the first side plane is located at the separation distance below the first side plane, and with a side extension passing the second side plane of the saw blade.

6. Saw blade according to claim 3, wherein the separation distance is approximately 0.02 mm.

7. Saw blade according to claim 1, wherein the straight part of each saw tooth is arranged having a longitudinal extension of approximately 2 mm.

8. Saw blade according to claim 1, wherein the side portions of the saw blade are arranged with at least one through holes or channels, during rotation in an operative direction being arranged to supply an air jet from the second side plane to the first side plane.

9. Saw blade according to claim 1, wherein the saw teeth, individually or as groups, have an alternating and in relation to each other, radially different extension from a center of the saw blade.

\* \* \* \* \*